United States Patent
Tanaka et al.

(10) Patent No.: US 6,292,323 B1
(45) Date of Patent: Sep. 18, 2001

(54) METHOD AND APPARATUS FOR REMOVING ACCUMULATED PARTICLES ON A HEAD IN AN INFORMATION RECORDING AND REPRODUCING APPARATUS

(75) Inventors: Hidetsugu Tanaka, Fujisawa; Yoshinao Harada, Chigasaki; Masahiko Sato, Yokohama; Takumi Satoh, Sagamihara, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/229,115

(22) Filed: Jan. 12, 1999

(30) Foreign Application Priority Data

Jan. 12, 1998 (JP) .................................................. 10-003616

(51) Int. Cl.[7] ..................................................... G11B 21/10
(52) U.S. Cl. ............................................................. 360/75
(58) Field of Search ........................... 360/75, 69, 73.03, 360/74.1, 78.04, 128, 137

(56) References Cited

U.S. PATENT DOCUMENTS 4,510,541 * 4/1985 Sasamoto ........................... 360/97.02
5,461,521 * 10/1995 Ito et al. ................................. 360/75

FOREIGN PATENT DOCUMENTS

| 1-30017 | * | 1/1989 | (JP) . |
| 1-154377 | * | 6/1989 | (JP) . |
| 2-50312 | * | 2/1990 | (JP) . |
| 3-183008 | * | 8/1991 | (JP) . |
| 3-225669 | * | 10/1991 | (JP) . |
| 6-333378 | * | 12/1994 | (JP) . |
| 97/19449 | * | 5/1997 | (WO) . |

\* cited by examiner

*Primary Examiner*—David Hudspeth
*Assistant Examiner*—James L Habermehl
(74) *Attorney, Agent, or Firm*—Randall J. Bluestone

(57) ABSTRACT

A method for removing accumulated particles that have adhered to a head for reading/writing data to a rotation disk type recording medium in an information recording and reproducing apparatus. First a disk read/write operation is stopped. A vibration amplitude is then selected. The head repeatedly performs a seek operation with the selected amplitude so as to vibrate the head. A new vibration amplitude is then selected, and the head repeatedly performs seek operations with the new amplitude. The vibration amplitude is gradually changed so that the head performs seek operations over a range of amplitudes, thereby removing accumulated particles that have adhered to the head.

10 Claims, 6 Drawing Sheets

| Vibration number | Number of cylinders (n) | Amplitude (inter-peak) (μm) | Number of vibrations (times) | Cylinder travel time (sec) | |
|---|---|---|---|---|---|
| | | | | Per vibration | Total |
| 1 | 1 | 6 | 1000 | 0.002 | 2 |
| 2 | 2 | 12 | 1000 | 0.002 | 2 |
| 3 | 5 | 30 | 1000 | 0.002 | 2 |
| 4 | 10 | 60 | 1000 | 0.003 | 3 |
| 5 | 20 | 120 | 1000 | 0.003 | 3 |
| 6 | 50 | 300 | 1000 | 0.004 | 4 |
| 7 | 100 | 600 | 1000 | 0.004 | 4 |
| 8 | 300 | 1800 | 1000 | 0.005 | 5 |
| 9 | 100 | 600 | 1000 | 0.004 | 4 |
| 10 | 50 | 300 | 1000 | 0.004 | 4 |
| 11 | 20 | 120 | 1000 | 0.003 | 3 |
| 12 | 10 | 60 | 1000 | 0.003 | 3 |
| 13 | 5 | 30 | 1000 | 0.002 | 2 |
| 14 | 2 | 12 | 1000 | 0.002 | 2 |
| 15 | 1 | 6 | 1000 | 0.002 | 2 |
| | | | | | 45 |

FIG. 6

METHOD AND APPARATUS FOR REMOVING ACCUMULATED PARTICLES ON A HEAD IN AN INFORMATION RECORDING AND REPRODUCING APPARATUS

BACKGROUND OF THE INVENTION

1. Field of the Invention

The present invention relates to an information recording and reproducing apparatus, and particularly to a system for removing accumulated particles that have adhered to a read/write head during operation.

2. Description of Related Art

In magnetic disk devices, a lubricating oil is used for the spindle motor, voice coil motor, and other components which are contained in a housing, and during operation, the aerosol lubricating oil is floating in the housing. If the magnetic disk device is operated for a long time in such an environment, hydrocarbons, which are a component of the lubricating oil, and internally produced dust and other particles stick to the magnetic head. The accumulated particles that adhere to the magnetic head alter the floating characteristics of the magnetic head on the magnetic disk surface. Further, in magnetic disk devices employing the CSS (Contact Start Stop) starting method, hydrocarbons move around to the underside (the surface facing the disk) of the slider to cause the disk and the slider to stick to each other while the magnetic disk is stationary, hereby causing a phenomenon, referred to as stiction, which can prevent restarting rotation of the disk.

One conventional method for removing accumulated particles that have adhered to the magnetic head is an ADM (Automated Disk Monitor) method in which the magnetic disk device is stopped and restarted by the CSS starting method, and the sliding between the magnetic disk and the magnetic head is used to remove accumulated particles on the magnetic head. However, the ADM method requires that the magnetic disk device stop for 10 to 20 seconds for each operation, and it is increasingly difficult to employ this method in recent computer systems which need to operate continuously. In addition, this method cannot be used in magnetic disk devices in which the CSS method is not employed.

Published Unexamined Japanese Patent Application No. 62-229,514 discloses a magnetic disk device in which, with the magnetic head being positioned at a track, the magnetic head is vibrated by moving it in the seek direction when the data read/write operation is stopped, so as to remove the dust adhering to the slider surface of the core of the magnetic head. However, this publication does not specifically disclose the amplitude and frequency of the oscillator for vibrating the head, nor does it show a vibration mode that is effective in removing the dust.

SUMMARY OF THE INVENTION

Accordingly, it is an object of the present invention to provide a method for removing accumulated particles that have adhered to a head of an information recording and reproducing apparatus, and an information recording and reproducing apparatus employing such method. More specifically, an object of the present invention is to provide a technique for removing accumulated particles only by controlling the seek operation of the actuator arm without requiring adding hardware to a conventional device or adding any special processing.

It is a further object of the present invention to provide a technique for removing accumulated particles in which, when a command comes from a host computer during the removal of accumulated particles, the command can be immediately executed.

In the present invention method for removing accumulated particles by vibrating the head through a seek operation, the amplitude of the vibrations are determined based upon the amount or length of the particles that have accumulated on the head. The amplitude of the head vibrations are selected so as to be close to the length of the accumulated particles. Typically, at the time the head is vibrated the length of the accumulated particles is not accurately known. In the present invention, to provide a vibration amplitude near the length of the accumulated particles, the amplitude is gradually changed to vibrate the head over a range of amplitudes. The head is moved in seek operations by providing a signal to the drive system of the actuator arm.

In one embodiment of the present invention, a read/write operation of the head is stopped, and a seek operation is performed a predetermined number of times for each of a plurality of amplitudes over a predetermined range of amplitudes. Accordingly, amplitudes near the length of the accumulated particles can be included in the series of amplitudes, and thus accumulated particles can be effectively removed. Furthermore, the recording medium itself continues to rotate while the head performs the seek operations to remove the accumulated particles. Thus, if an access command comes from a host computer, the head can be positioned at a predetermined track to execute the command requiring only the time for restarting the read/write operation and performing a seek operation. In the present invention, the amplitude means an inter-peak value determined by the number of cylinders (tracks) the head moves. Furthermore, gradually changing the amplitude includes gradually increasing the amplitude from a small value to a large value, gradually decreasing the amplitude from a large value to a small value, and a combination of increasing and decreasing periods. The number of seek operations at each amplitude may be constant, or varied over the range of amplitudes. Also, although the frequency of vibrations gradually changes as the amplitude for the seek is gradually changed, the frequency of the vibrations is preferably selected in the range of 100 to 600 Hz.

In another embodiment of the present invention, the maximum amplitude of the selected plurality of amplitudes is selected to be at least greater than the length of accumulated particles that have adhered to the slider. Accordingly, it is more likely that an amplitude near the length of the accumulated particles is selected from the plurality of amplitudes. When the operation of removing accumulated particles according to the present invention is performed, the length of accumulated particles should be between the maximum vibration amplitude and the minimum vibration amplitude. In a preferred embodiment, the procedure for removing accumulated particles is executed before the particle accumulation becomes so large that the stiction prevents restarting rotation of the disk. The minimum amplitude value is selected to be a value smaller than an estimated length of the accumulated particles at the point where the stiction caused by the accumulated particles prevents restarting rotation of the disk.

Although the present invention can be implemented by changing the control program of the information recording and reproducing apparatus, alternatively the present invention can also be implemented by adding hardware to a conventional information recording and reproducing apparatus.

BRIEF DESCRIPTION OF THE DRAWINGS

FIG. 6 is a figure showing the vibration modes used in an embodiment of the present invention.

DETAILED DESCRIPTION OF THE PREFERRED EMBODIMENTS

This invention is described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

Figure 1:
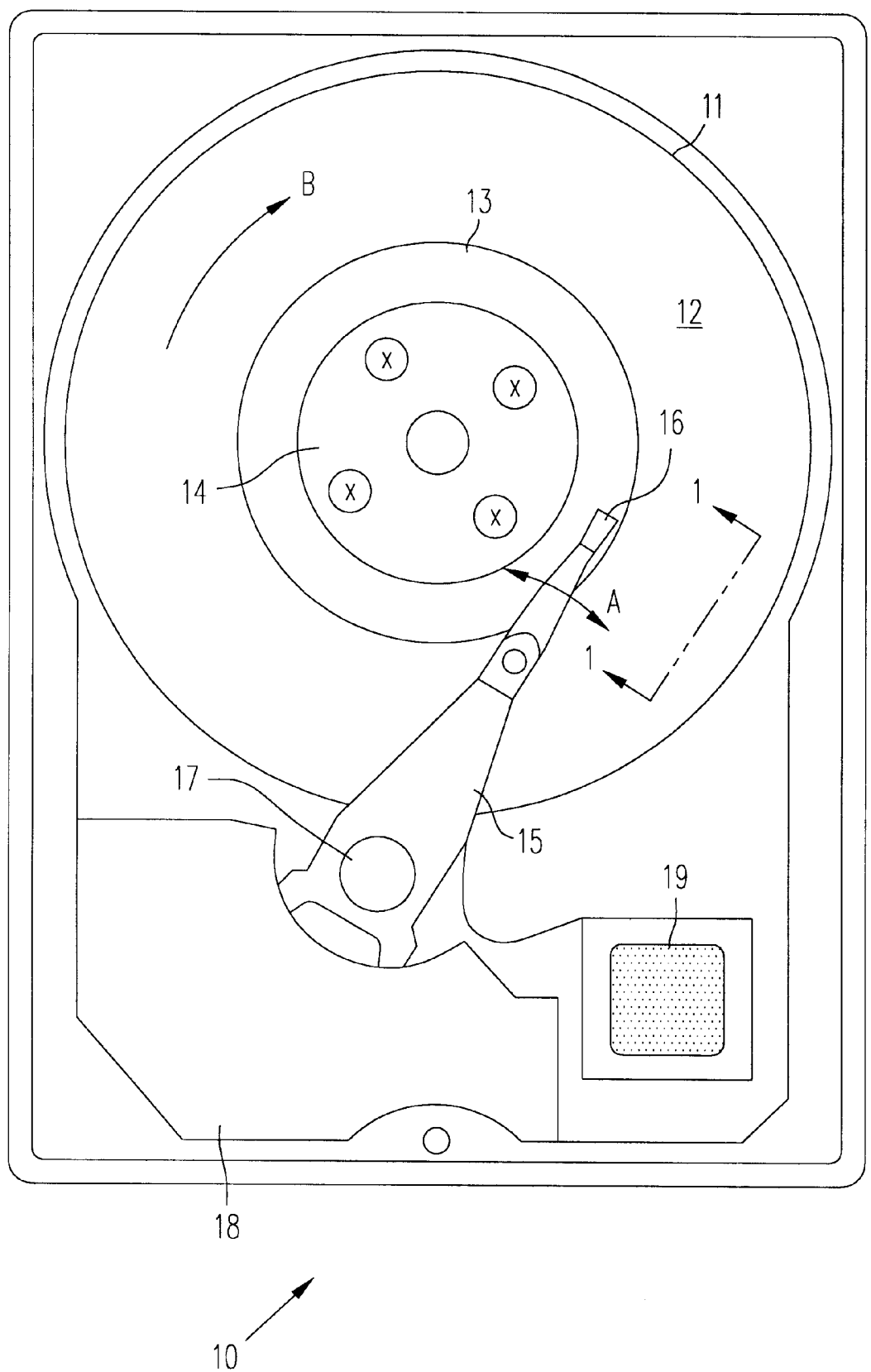
FIG. 1 is a schematic plan view of a magnetic disk used in an implementation of the present invention.

FIG. 1 is a schematic plan view of a magnetic disk device 10 used in an implementation of the present invention. A plurality of magnetic disks 11 are mounted on a spindle shaft 14. They are rotated by a spindle motor (not shown) in the direction of an arrow B along with the spindle shaft 14. An actuator arm 15 is driven by a VCM (Voice Coil Motor) 18 to move on the surface of the magnetic disk 11 in the direction of arrow A. The actuator arm 15 has a stacking structure for each magnetic disk, and to each top end thereof, a magnetic head 16, also referred to as a transducer assembly, is respectively attached for the upper and lower sides of each magnetic disk through a flexible member provided with elasticity. The magnetic head 16 comprises a slider (not shown), and a transducer element (not shown) mounted on the slider. The transducer element bidirectionally converts an electrical signal and the magnetic signal stored on the magnetic disk to perform a data write or read on the magnetic disk 11.

Each magnetic disk 11 has a recording area 12 used to record information, and a non-recording area 13 for positioning the magnetic head 16 when the rotation of the magnetic disk 11 is stopped. The recording area 12 is divided into a plurality of circular cylinders. Each cylinder is comprised of a plurality of circular tracks. In one embodiment, there are 9000 tracks on the magnetic disk, and each track is 3 um wide. The surface of the non-recording area 13 is provided with a texture, which reduces the frictional force between the slider of the magnetic head 16 and the magnetic disk 11 when the rotation of the magnetic disk 11 is initiated by the CSS method. In a data write or read operation, a seek operation is performed in which the actuator arm 15 swings on the surface of the rotating magnetic disk 11 in the direction of arrow A, and the transducer element scans the position of a track on the surface of the recording area 12. During these operations the slider is provided with a floating force by the air flow produced on the surface of the magnetic disk 11, and the magnetic head 16 floats while maintaining a predetermined distance from the surface of the magnetic disk 11. A controller 19 includes an electronic circuit for controlling the operation of the actuator arm 15 and performing a data read/write operation, also referred to as a disk access operation.

Figure 2:
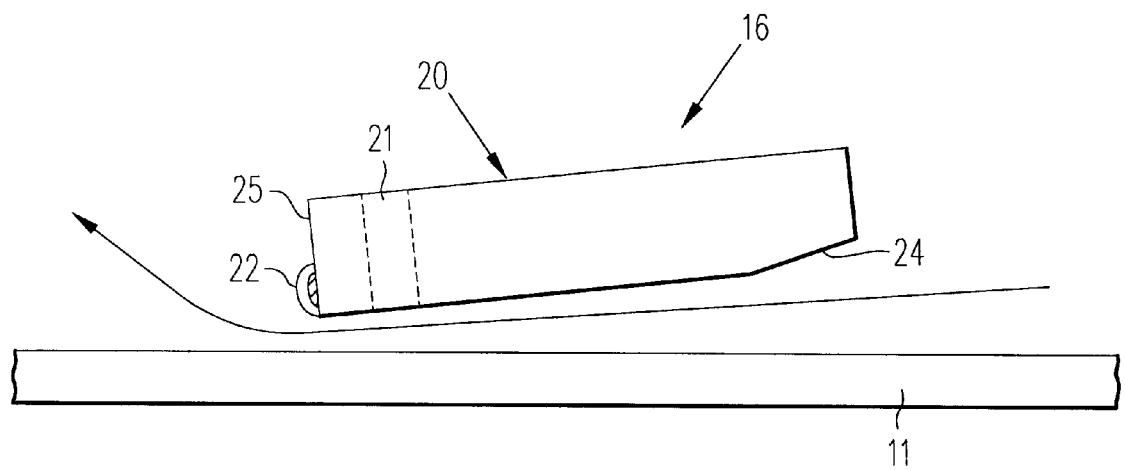
FIG. 2 is a side view of a magnetic disk used in an implementation of the present invention.

FIG. 2 is a side view in which the magnetic head 16 in FIG. 1 is seen from the direction of arrows 1—1. In a slider 20, a tapered portion 24 is formed in the direction of receiving the surface air flow due to the rotation of the magnetic disk. On the side opposite to the tapered portion, a transducer element 21 is formed. Since the air flow flowing from the tapered portion 24 between the slider 20 and the magnetic disk 11 suddenly expands under the rear end 25 of the slider and loses its pressure, the aerosol and/or gas phase hydrocarbons lose their thermal kinetic energy. As a result, accumulated hydrocarbon particles 22 easily adhere to the rear end of the slider 25.

Figure 3:
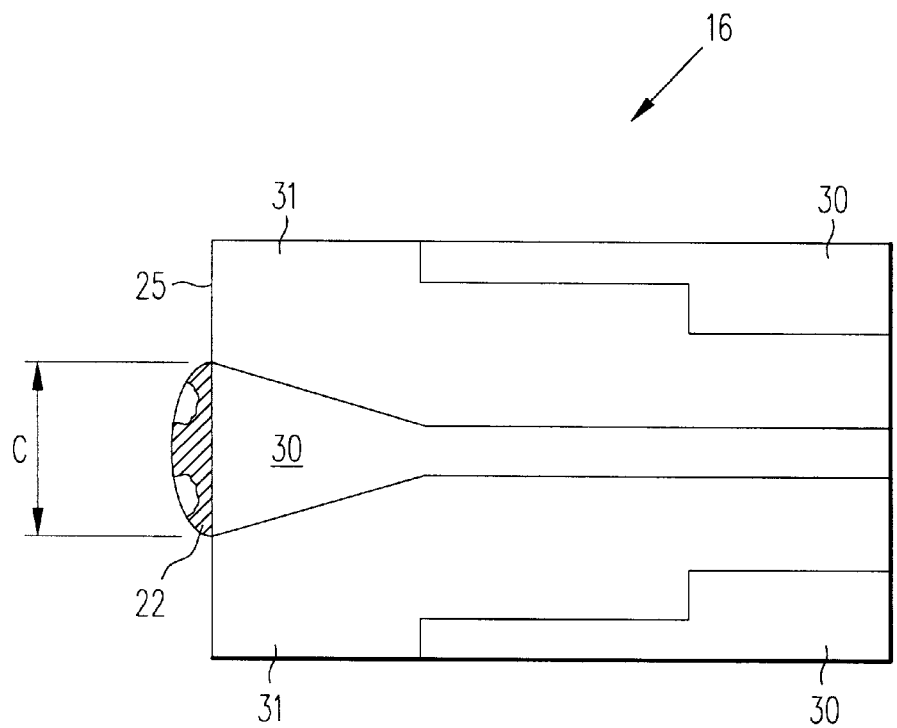
FIG. 3 is a plan view of the underside of a magnetic head used in an implementation of the present invention.

FIG. 3 is a plan view of the underside of the magnetic head 16 of FIG. 2 as seen from the disk surface side. On the magnetic head underside, regions 31 are recessed for adjusting the floating characteristics of slider 20, and regions 30 are formed in the shape of a protrusion. In environments in which aerosol and/or gaseous lubricating oil is floating on the magnetic disk surface, when magnetic head 16 performs a seek operation the hydrocarbons brought by the air flow over the magnetic disk surface gradually accumulates on the rear end 25 over the full width of the protrusion 30 of the slider. The dimension C represents the width of the protrusion 30 on which the accumulated hydrocarbon particles 22 are stored. In one embodiment the width of protrusion 30 is 500 $\mu$m. The dimension C defines the maximum length of accumulated particles in connection with the present invention.

Figure 4:
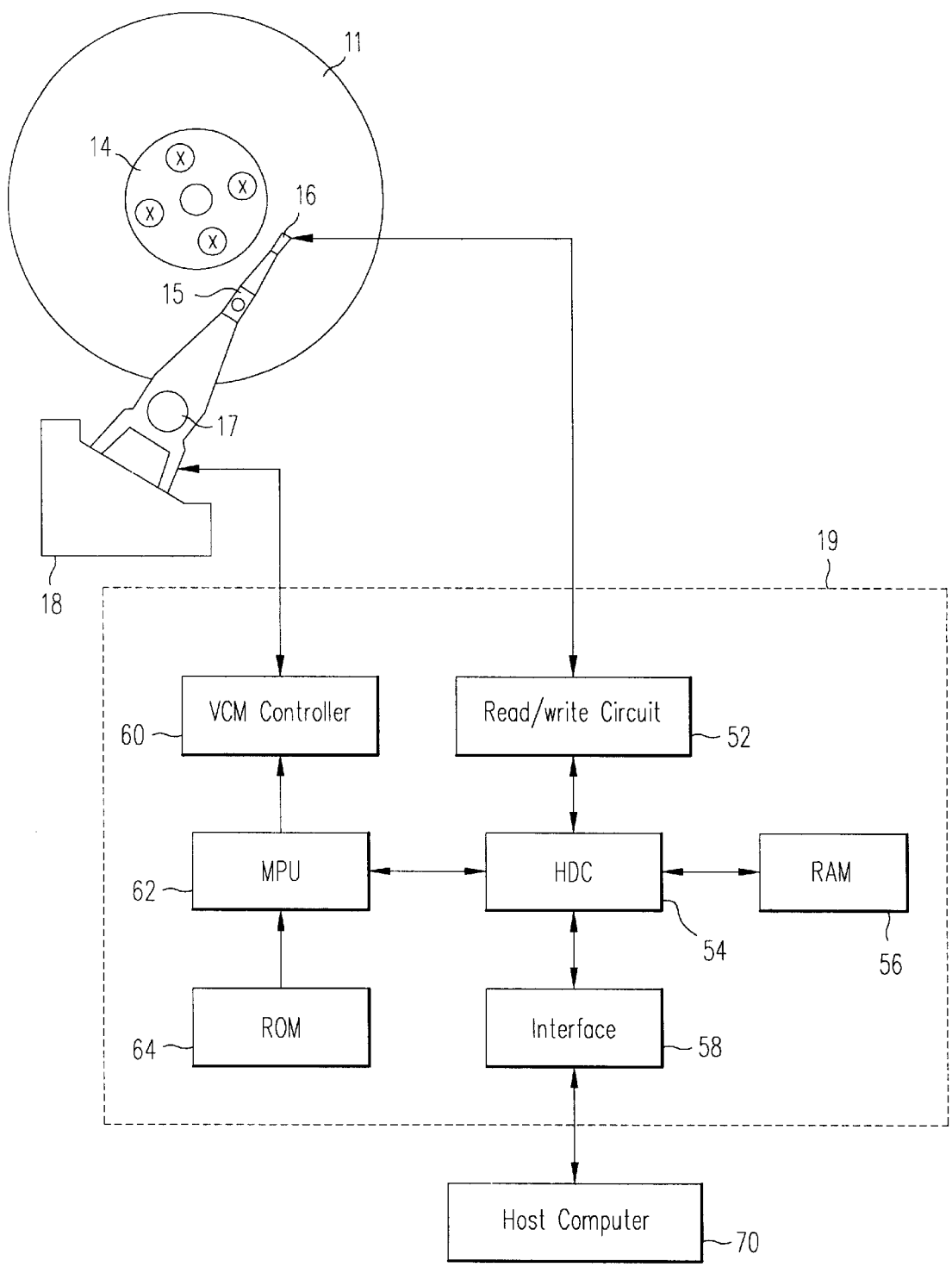
FIG. 4 is a schematic block diagram of a magnetic disk used in an implementation of the present invention.

FIG. 4 is a schematic block diagram of a magnetic disk used in an implementation of the present invention. The controller 19 controls the seek operation of the actuator arm 15 through a VCM controller 60, and controls the read/write operation of the magnetic head 16 through a read/write circuit 52. The read/write circuit 52 is connected to a hard disk controller (HDC) 54. The read/write circuit 52 bidirectionally converts a digital signal processable by a computer and an electric signal supplied to or generated in the magnetic head.

The HDC 54 and a memory (RAM) 56 are connected through an interface 58 to a host computer 70. HDC 54 controls RAM 56, data transfer between RAM 56 and disk 11, creation of an ID table, and calculation of servo data. RAM 56 stores microcode for controlling the magnetic disk device, which is read out from the disk 11 when the magnetic disk device is started, an ID table, and data to be transferred between host computer 70 and disk 11. HDC 54 is connected to a microprocessor unit (MPU) 62, to which a memory (ROM) 64 and a VCM controller 60 are connected. MPU 62 interprets the commands sent from host computer 70 to cause HDC 54 to create the ID table, and gives an instruction for performing a data read/write on the address specified by the command, and sends control information for causing the magnetic head to seek a predetermined track to the VCM controller 60 according to the servo information of the disk calculated in the HDC.

VCM controller 60 drives VCM 18 so as to position magnetic head 16 at a predetermined track according to the control information from MPU 62. ROM 64 stores the necessary microcode for starting the magnetic disk device. The program for executing this embodiment is read from the magnetic disk 11 to the RAM 56 as part of the microcode for controlling the magnetic disk device when the device is started. MPU 62 interprets and executes this microcode. The program for executing the present invention may be stored in the ROM 64. Further, this embodiment can be implemented by simply rewriting the microcode so as to execute the present invention method of removing accumulated particles, without adding any other microcode or hardware.

Figure 5:
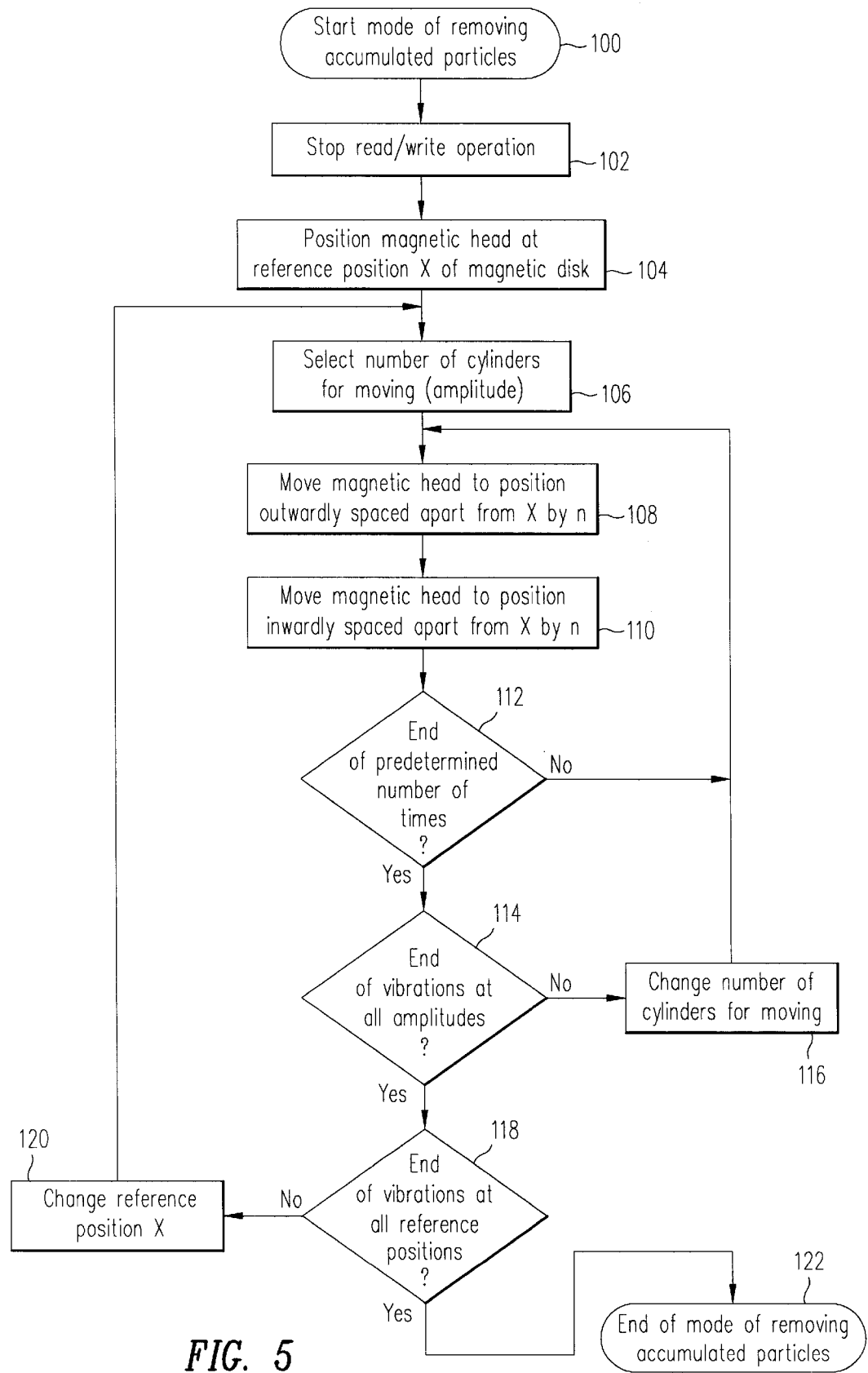
FIG. 5 is a flowchart showing a procedure for the mode of removing accumulated particles used in an embodiment of the present invention.

FIG. 5 is a flowchart of a procedure for the mode of removing accumulated particles according to an embodiment of the present invention. At block 100, the mode of removing accumulated particles is started. In this embodiment, the mode of removing accumulated particles is carried out with a frequency of once every six days of continuous operation of the magnetic disk device. Although the frequency of the removal mode can be appropriately selected according to the shape of the magnetic head, the properties of the internally used lubricating oil, and the like, the removal mode should be executed before the hydrocarbon accumulation becomes so large that the stiction caused by the accumulated particles prevents restarting rotation of the disk. Preferably, the selection of the removal mode is previously programmed in connection with the operation time of the magnetic disk device. In block 102, MPU 62 instructs HDC 54 to stop the read/write operation. However, magnetic disk 11 continues to rotate, and the actuator arm 15 can also swing around the shaft 17 as controlled by the VCM controller 60. In block 104, MPU 62 instructs VCM controller 60 to position magnetic head 16 at a cylinder (track) position X, and the VCM controller 60 controls VCM 18 according to the instruction. In this embodiment, X is first defined to be in the neighborhood of the inner periphery of the magnetic disk 11.

In block 106, the number of cylinders for obtaining an amplitude for moving the magnetic head from the position X is assumed to be n, and one cylinder is selected first. In block 108, the magnetic head is moved to the position of the cylinder X+1 that is located one cylinder away from position X in a direction towards the outer periphery of magnetic disk 11. In block 110, the magnetic head is moved to the position of the cylinder X−1 that is located two cylinders away from cylinder X+1 in a direction towards the inner periphery of magnetic disk 11. This operation corresponds to the vibrating of the magnetic head 16 with an amplitude of the number of cylinders 2n×3 μm (6 μm), centered on cylinder X. In this mode of removing accumulated particles, the magnetic head stops the read/write operation, and it travels between cylinders at the highest speed or acceleration determined by the mechanical capability of the actuator arm drive system and the number of cylinders the magnetic head travels across.

In block 112, it is determined whether a predetermined number of vibrations for n being one cylinder have been completed. In one embodiment, the predetermined number of vibrations is selected to be 1,000. After the end of the predetermined number of vibrations, the process goes to block 114. In this embodiment, the predetermined number of vibrations are performed at each amplitude while gradually increasing the number of cylinders n to the maximum amplitude and gradually decreasing n to the beginning amplitude. Accordingly, in block 114, it is determined whether or not the predetermined number of vibrations have been completed for all of the amplitudes. If the vibrations for all the amplitudes have not yet been completed, another remaining amplitude is selected in step 116. In one embodiment, the amplitude is increased from one cylinder to 300 cylinders through eight steps, and then it is decreased to one cylinder through the same steps. The vibration modes employed in this embodiment are shown in FIG. 6.

In FIG. 6, the travel time for each cylinder is 0.002 seconds for the amplitude of 6 μm and the number of vibrations corresponds to a frequency of 500 Hz. For an amplitude of 1800 μm the travel time is 0.005 sec and the number of vibrations corresponds to a frequency of 200 Hz. In a preferred embodiment, the frequency is selected to be in the range of 100 Hz to 600 Hz.

In one embodiment, the maximum length of accumulated particles is 500 μm and the spacing between cylinders is 3 μm. Therefore, if 85 cylinders are used on one side, the inter-peak amplitude is 510 μm. This peak amplitude is sufficient, however, about 100 cylinders would be preferable to provide an allowance on the order of 20%. The maximum number of cylinders, 300, selected in FIG. 6 was set to make enough allowance. In a preferred embodiment of the present invention, it is important that a plurality of vibration amplitudes include amplitudes near the length of the accumulated particles that are adhering to the head when the removal mode is executed. In alternative embodiments, the amplitude can be gradually changed in a sequence which is different from FIG. 6.

The selection of the maximum number of cylinders is important for effectively removing accumulated particles. It is known that accumulated particles 22 that have grown to a predetermined length, as shown in FIG. 3, can effectively be removed if the inter-peak amplitude is selected to be equal to the length of the accumulated particles. Accordingly, the maximum amplitude should exceed at least the maximum length of accumulated particles that can be expected from the shape of the slider. The length of the accumulated particles is typically not clearly known when the removal mode is executed. In such embodiments, however, a vibration with an amplitude near the length of accumulated particles can be provided by generating vibrations with a plurality of amplitudes. The mode of removing accumulated particles should be executed before the length of accumulated particles that have adhered to the head becomes large enough to prevent restarting the disk, and the minimum number of cylinders or the minimum amplitude should be selected to be a value smaller than at least the length of accumulated particles at that point of time. If the step change of the number of cylinders in the gradual increase or decrease is made smaller, the amplitude and the length of accumulated particles can be more closely matched.

Further, in the FIG. 5 embodiment, a plurality of positions are selected as reference positions X. In block 118, it is determined whether the vibrations in the vibration modes shown in FIG. 6 have been completed at all of the reference positions. In this embodiment, the reference positions X are selected at two places which are near the inner periphery and the outer periphery of the magnetic disk 11, respectively. Since the speed of the air flow on the magnetic disk surface differs in the vicinities of the inner and outer peripheries, they would effectively act on the removal of accumulated particles, respectively. Further, a position near the center and other positions may also be added as reference positions. When the vibrations in the vibration modes shown in FIG. 6 have terminated in the vicinity of the inner periphery, the reference position X is selected in the vicinity of the outer periphery at block 120 and the process continues at block 106. The vibrations in the vibration modes shown in FIG. 6 also finish in the vicinity of the outer periphery, and the mode of removing accumulated particles completes at block 122.

The features of this embodiment include that, if a command comes from a host computer when the magnetic disk is operated in the mode of removing accumulated particles, it can be processed in a very short time. According to FIG. 6, the procedure for removing accumulated particles employed in this embodiment requires 45 seconds to complete. However, the magnetic disk 11 continues to rotate when the procedure for removing accumulated particles is being executed. Hence, when MPU 62 receives a command from the host computer, MPU 62 immediately interrupts the procedure for removing accumulated particles to start the operation of read/write circuit 52. MPU 62 then sends an instruction to VCM controller 60 to position the head at the cylinder position specified by the command. The processing delay for the command received during the procedure for removing accumulated particles is 5 to 6 msec. When the processing of the command is complete, the procedure for removing accumulated particles can resume at the point where it was interrupted.

Figure 7:
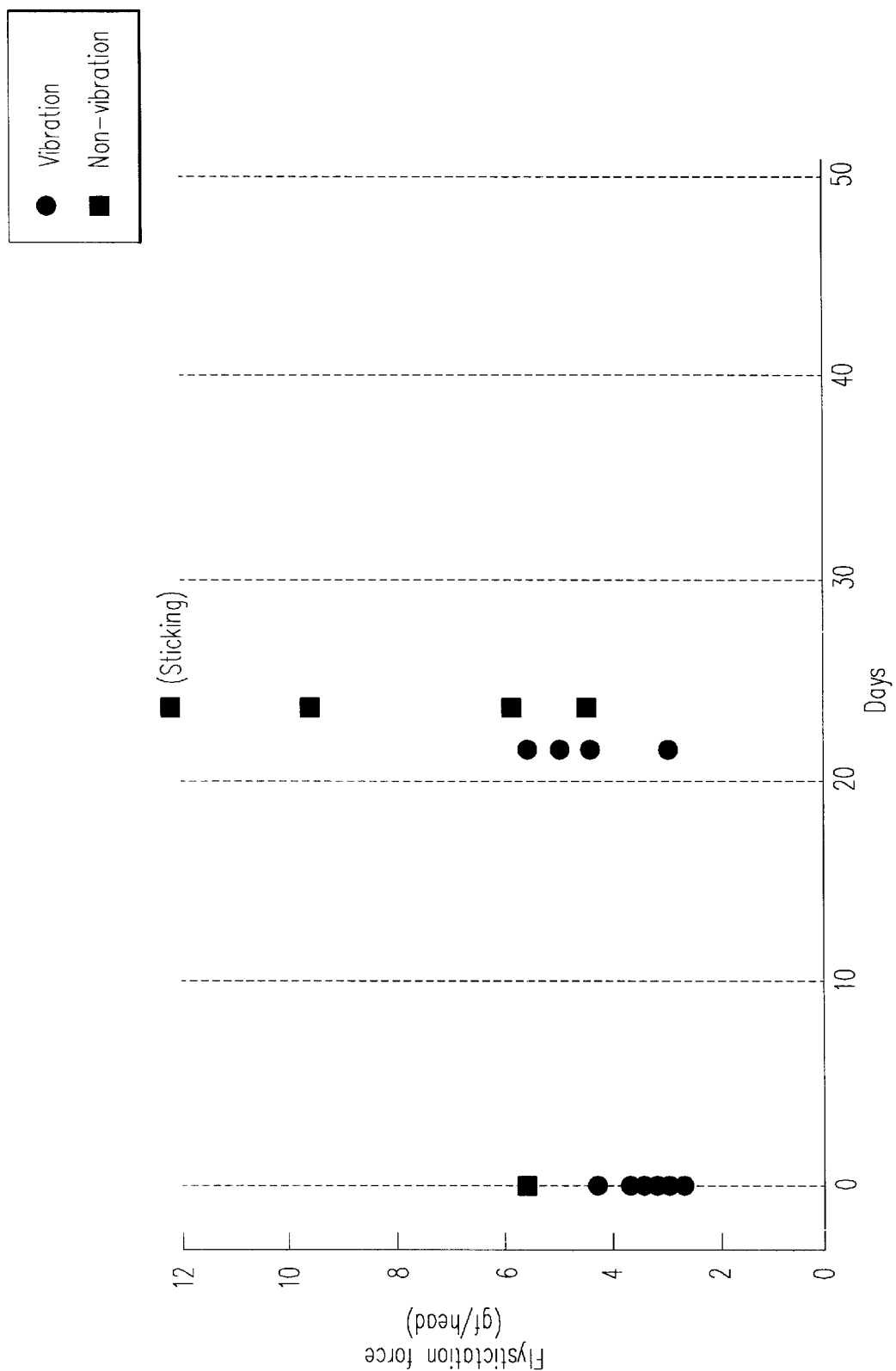
FIG. 7 is a graph showing the effect of a method for removing accumulated particles according to an embodiment of the present invention.

FIG. 7 shows the effect of removing accumulated particles using a FIG. 5 embodiment. FIG. 7 gives a comparison of the degree of removal of accumulated particles as a stiction force when eight magnetic disk devices are divided into two groups each consisting of four devices, and the procedure for removing accumulated particles of this embodiment is not applied to one group while it is applied to the other group. For the group to which the procedure for removing accumulated particles was not applied, a vibration was given so that the actuator arm continuously moved for 21 days between the outermost track and the innermost track, without executing a read/write. The vibration of the actuator arm corresponds to the vibration of the magnetic head with only one maximum amplitude allowed from the size of the magnetic disk. For the group to which the procedure for removing accumulated particles was applied, the actuator arm was vibrated for 21 days under the same conditions and the procedure for removing accumulated particles was performed at the end of each six day period. After operating the disk drives for 21 days, the magnetic head 16 was moved to the non-recording area 13 in both groups, the rotation of the magnetic disk was stopped by the CSS method, and the magnetic head 16 and the magnetic disk 11 were put in contact with each other and left for a half day.

After the half day, the amount of particles remaining on the magnetic head was measured as follows. When a current is gradually fed to the spindle motor with the magnetic disk at rest, the starting torque gradually increases. When a certain current value is exceeded, the spindle motor or the magnetic disk begins to rotate and the current value rapidly decreases. Since the current value of the spindle motor correlated with the starting torque, the maximum value of the motor current to start the rotation correlates with the maximum starting torque of the motor, or the force preventing the rotation of the magnetic disk. The force preventing the rotation of the magnetic disk is given mainly by the adhesion between the magnetic head and the magnetic disk, namely, the stiction force. The vertical axis of FIG. 7 is a value obtained by converting the value of the spindle motor current to the stiction force, and the horizontal axis is the operation time in days under the above test conditions. The stiction force before operation was 3 gf to 6 gf per magnetic head for the magnetic disks in both groups. After 21 days, the stiction force increased to 4 gf to 12 gf in the group for which the procedure for removing accumulated particles was not performed, and in one device the stiction force was sufficiently large to prevent restarting rotation of the magnetic disk.

This demonstrates that a plurality of vibrations with a single selected amplitude value can be inadequate to effectively remove accumulated particles on the magnetic head, because the difference between the length of the accumulated particles and the amplitude is too large. In the group for which the procedure for removing accumulated particles was performed, no change was seen in the stiction values between the start and end of the test. In addition, it was also determined that, even if the stiction force increases, it returns to the initial value if the startup by the CSS is successful.

In accordance with the present invention, a procedure is provided in which accumulated particles can be effectively removed by only controlling the seek operation of the actuator arm, without requiring hardware to be added to a conventional recording device or any special processing of the slider.

The present invention further provides a technique for removing accumulated particles in which, if a command comes from a host computer during the removal of accumulated particles, the command can be immediately executed.

We claim:

1. A method of removing accumulated particles that have adhered to a transducer assembly for reading/writing data to a rotating disk type recording medium in an information recording and reproducing apparatus, said method comprising the steps of:
    (a) stopping a disk access operation of the transducer assembly;
    (b) selecting a first amplitude;
    (c) causing said transducer assembly to repeatedly perform seek operations having said first amplitude;
    (d) selecting a new amplitude;
    (e) causing said transducer assembly to repeatedly perform seek operations having said new amplitude; and
    (f) repeating said steps (d) and (e) so as to gradually change said new amplitude while repeatedly performing seek operations.

2. The method of claim 1 wherein a maximum value of the amplitudes selected in said steps (b) and (d) is at least equal to the length of accumulated particles that have adhered to a slider in said transducer assembly.

3. A method of removing accumulated particles that have adhered to a transducer assembly for reading/writing data to a rotating disk type recording medium in an information recording and reproducing apparatus, said method comprising the steps of:

(a) stopping a disk access operation of the transducer assembly;

(b) selecting a first amplitude and a first frequency;

(c) causing said transducer assembly to repeatedly perform seek operations having said first amplitude and said first frequency;

(d) selecting a new amplitude and a new frequency;

(e) causing said transducer assembly to repeatedly perform seek operations having said new amplitude and said new frequency; and (f) repeating said steps (d) and (e) so as to gradually change said new amplitude and said new frequency while repeatedly performing seek operations.

4. The method of claim 3 wherein said first frequency and said new frequency are selected in a range of 100 Hz to 600 Hz.

5. A method of removing accumulated particles that have adhered to a transducer assembly for reading/writing data to a rotating disk type recording medium in an information recording and reproducing apparatus, said method comprising the steps of:

(a) stopping a disk access operation of the transducer assembly;

(b) positioning the transducer assembly at a first track on said recording medium;

(c) selecting a first number of tracks;

(d) moving said transducer assembly in a first direction said first number of tracks away from said first track;

(e) moving said transducer assembly in a second direction said first number of tracks away from said first track; and (f) repeating said steps (c), (d) and (e) a plurality of times while gradually increasing said first number of tracks selected in said step (c) to a number of tracks corresponding to half of a maximum amplitude that said transducer assembly is moved.

6. The method of claim 5 wherein said maximum amplitude value is selected to be at least equal to the length of the accumulated particles that have adhered to a slider.

7. A method of removing accumulated particles that have adhered to a transducer assembly for reading/writing data to a rotating disk type recording medium in an information recording and reproducing apparatus, said method comprising the steps of:

(a) stopping a disk access operation of the transducer assembly;

(b) positioning the transducer assembly at a first track on said recording medium;

(c) selecting a first number of tracks;

(d) moving said transducer assembly in a first direction said first number of tracks away from said first track;

(e) moving said transducer assembly in a second direction said first number of tracks away from said first track; and (f) repeating said steps (c), (d), and (e) a plurality of times while gradually decreasing said first number of tracks selected in said step (c).

8. An information recording and reproducing apparatus comprising:

a rotating disk type recording medium having a plurality of tracks;

a transducer assembly for reading/writing data to said recording medium;

an actuator arm having said transducer assembly mounted thereon for positioning said transducer assembly at a predetermined one of said tracks;

a controller for controlling disk access operations of said transducer assembly and operation of said actuator arm, said controller having a storage element; and a first component of a computer readable medium to direct the information recording and reproducing apparatus to function in a specified manner, comprising:

(a) instructions to stop a disk access operation of the transducer assembly;

(b) instructions to select a first amplitude;

(c) instructions to cause said transducer assembly to repeatedly perform seek operations having said first amplitude;

(d) instructions to select a new amplitude;

(e) instructions to cause said transducer assembly to repeatedly perform seek operations having said new amplitude; and (f) instructions to repeat said steps (d) and (e) so as to gradually change said new amplitude while repeatedly performing seek operations.

9. The information recording and reproducing apparatus of claim 8 wherein said first component of a computer readable medium comprises a first component of said rotating disk type recording medium.

10. A computer readable medium to direct an information recording and reproducing apparatus to perform a method of removing accumulated particles that have adhered to a transducer assembly for reading/writing data to a rotating disk type recording medium, comprising:

(a) instructions to stop a disk access operation of the transducer assembly;

(b) instructions to select a first amplitude;

(c) instructions to cause said transducer assembly to repeatedly perform seek operations having said first amplitude;

(d) instructions to select a new amplitude;

(e) instructions to cause said transducer assembly to repeatedly perform seek operations having said new amplitude; and (f) instructions to repeat said steps (d) and (e) so as to gradually change said new amplitude while repeatedly performing seek operations.

* * * * *